United States Patent [19]

Grosseau

[11] 4,041,924
[45] Aug. 16, 1977

[54] RECIPROCATING INTERNAL COMBUSTION ENGINE

[75] Inventor: Albert Grosseau, Chaville, France

[73] Assignee: Societe Anonyme Automobiles Citroen, France

[21] Appl. No.: 613,436

[22] Filed: Sept. 15, 1975

[30] Foreign Application Priority Data

Oct. 9, 1974 France ................... 74.34037

[51] Int. Cl.² .............. F02B 77/00; F01M 1/00
[52] U.S. Cl. .............. 123/193 CP; 92/162 R; 123/196 CP; 123/198 P
[58] Field of Search .............. 92/162, 162 R; 123/193 CP, 196 CP, 198 P, 41.86

[56] References Cited

U.S. PATENT DOCUMENTS

| | | | |
|---|---|---|---|
| 1,871,820 | 8/1932 | Morton | 123/193 CP |
| 2,513,492 | 7/1950 | Kleinfeld | 123/193 CP |
| 2,547,957 | 4/1951 | Meadows | 92/162 R |
| 3,364,675 | 1/1968 | Dorer | 92/162 R |
| 3,379,186 | 4/1968 | Yost | 123/193 CP |
| 3,396,976 | 8/1968 | Reinhoudt | 92/162 R |
| 3,489,130 | 1/1970 | Polidan | 123/193 CP |
| 3,544,118 | 12/1970 | Klein | 92/162 R |
| 3,653,303 | 4/1972 | Zurcher | 92/162 |

*Primary Examiner*—Carroll B. Dority, Jr.
*Assistant Examiner*—Daniel J. O'Connor
*Attorney, Agent, or Firm*—Stevens, Davis, Miller & Mosher

[57] ABSTRACT

An internal combustion engine comprises a cylinder having a horizontal axis, one end of the cylinder being formed as a combustion chamber and the other end opening into a crankcase receiving a lubricating atmosphere. A piston slidable in the cylinder has a space therein communicating with the crankcase. The piston is formed with grooves of rectangular cross-section with a base and a pair of transverse surfaces. A scraper groove furthest from the combustion chamber receives a scraper ring and has orifices in its base communicating with the piston space, the other sealing grooves receiving piston rings, annular gaps between the piston and cylinder being left on each side of the piston and scraper rings. The annular gaps are placed in continuous communication with the groove bases by at least one recess on each transverse surface of a sealing groove and by at least one recess on that transverse surface of the scraper groove which is nearest the combustion chamber.

8 Claims, 2 Drawing Figures

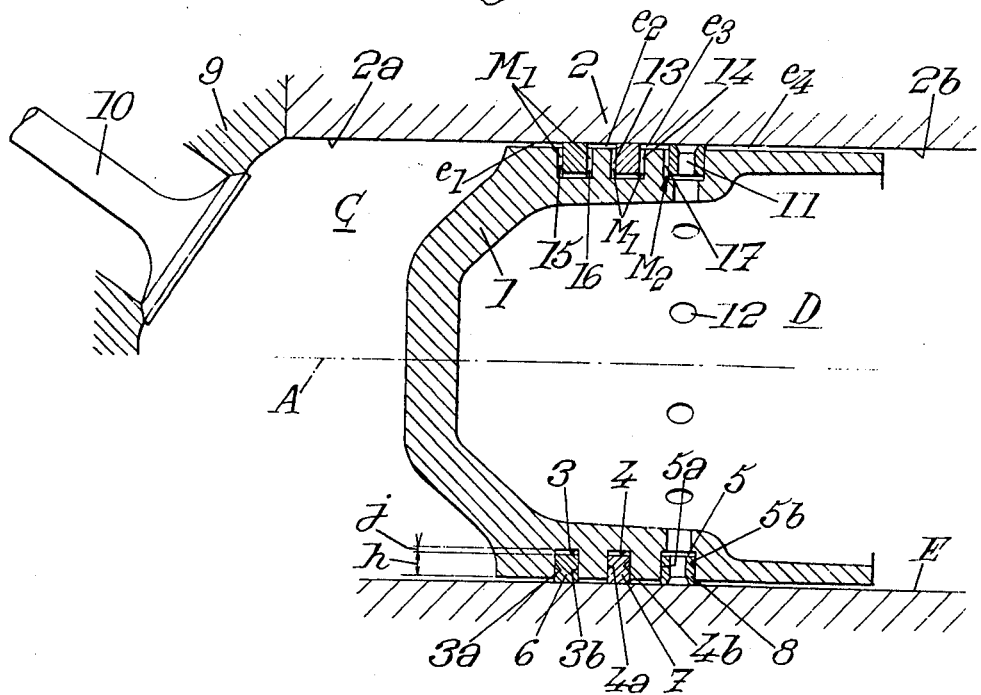
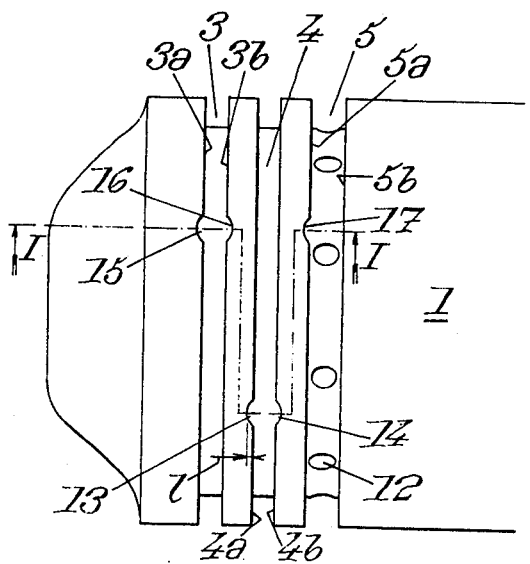

RECIPROCATING INTERNAL COMBUSTION ENGINE

BACKGROUND OF THE INVENTION

The invention relates to a reciprocating internal combustion engine.

In particular, the invention concerns such an engine which is of the kind comprising: a cylinder having a substantially horizontal axis and having one end thereof shaped as a combustion chamber and the other end thereof opening into a crankcase adapted to receive a lubricating atmosphere, said cylinder having a bottom zone where liquid lubricant may collect when the engine is stationary; a piston slidable in said cylinder and having a space therein communicating with said crankcase, said piston having an outside surface formed with at least one peripheral sealing groove and a peripheral scraper groove, said peripheral grooves being of rectangular cross-section with a base and a pair of transverse surfaces, said scraper groove being nearest said other end of said cylinder and having the base thereof formed with orifices via which said scraper groove communicates with said space in said piston; a substantially rectangular cross-section piston ring received in each said sealing groove; and a substantially rectangular cross-section scraper ring received in said scraper groove; said piston being received in said cylinder with clearance whereby annular gaps are formed between said outside surface of said piston and said cylinder on each side of each of said piston and scraper rings.

Internal combustion engines of such a kind in which the cylinders have their axes extending substantially horizontally are usually referred to as flat cylinder engines.

The invention relates more particularly, as being the case where the invention seems likely to be most useful, but not exclusively, to internal combustion engines having cylinders whose cylindrical peripheral wall is completely closed and which operate on a four-stroke cycle.

It has been found that flat cylinder engines of this kind often produce more exhaust smoke on starting than is produced by engines having other cylinder arrangements.

SUMMARY OF THE INVENTION

It is a main object of this invention to improve the practical performance of such engines, inter alia so that they suffer either not at all or less than previously from the disadvantage just referred to.

According to the invention, the improvement in an internal combustion engine of the kind described resides in each said sealing groove being provided with first narrow passage means providing a continuous communication between the base of said sealing groove and said annular gaps on both sides of said piston ring in said sealing groove; said scraper groove being provided with second narrow passage means providing communication between the base of said second groove and at least that annular gap which is on the side of said scraper ring nearest said one end of said cylinder; both said first and said second passage means being disposed at a level above said bottom zone of said cylinder.

Advantageously, said first passage means comprises at least one recess on each transverse surface of said sealing groove and said second passage means comprises at least one recess on that transverse surface of said scraper groove which is nearest said one end of said cylinder, said recesses extending from said outside surface of said piston towards the bases of said grooves over a distance at least equal to the engaged thicknesses of said sealing and scraper rings in said grooves.

Preferably, each recess in one transverse surface of said sealing groove is disposed opposite a corresponding recess in the other transverse surface of said sealing groove.

Preferably, each said recess has a cross-section in the form of a segment of a circle; and the maximum dimension of each said recess along said axis of said cylinder is at most 0.2 millimeter. In the case of a sealing groove having opposed recesses, said opposed recesses are conveniently inscribed in a single circle.

In accordance with another aspect, the invention provides a piston for an internal combustion engine, said piston having a crown and having a space therein; said piston having an outer surface formed with at least two peripheral grooves each having a substantially rectangular cross-section with a base and a pair of transverse surfaces; one of said grooves furthest from said piston crown having the base thereof formed with orifices for communication with said space in said piston; in which piston the improvement comprises: said one groove being formed at least on its transverse surface nearest said piston crown with a recess extending from said outside surface of said piston towards the base of said one groove; and each other of said grooves being formed on each of its transverse surfaces with at least one recess extending from said outside surface of said piston towards the base of said groove.

Preferably, each of said recesses in said grooves has a cross-section in the form of a segment of a circle.

Advantageously, said recesses in said grooves are arranged so that said grooves are devoid of said recesses over a peripheral zone of the piston covering more than 180°.

BRIEF DESCRIPTION OF THE DRAWINGS

Further objects and advantages of the invention will become apparent from the following description of a preferred embodiment of the invention, given with reference to the appended drawings, in which:

FIG. 1 is a diagrammatic view in cross-section of a cylinder and piston of an engine according to the invention, the piston being shown in section on the line I—I of FIG. 2; and FIG. 2 is a plan view, but with the rings removed, of the piston shown in FIG. 1.

DESCRIPTION OF THE PREFERRED EMBODIMENT

FIG. 1 is a partial view of a reciprocating internal combustion engine having at least one piston 1 adapted to slide reciprocatingly in a cylinder 2 and formed with three peripheral grooves 3, 4 and 5 which are rectangular in cross-section and each of which is adapted to receive a respective substantially rectangular cross-section ring 6, 7, and 8.

Annular gaps $e_1$, $e_2$, $e_3$ and $e_4$ are therefore left, on either side of each ring, between piston 1 and cylinder 2.

Axis A of cylinder 2 is substantially horizontal. One end 2a of cylinder 2 is shaped as a combustion chamber C; more particularly, and as shown in FIG. 1, cylinder end 2a is closed by a cylinder head 9 which is shown only partially and which has inlet and exhaust valves, as 10. The other cylinder end 2b extends into a crankcase (not shown) adapted to receive a lubricating atmosphere from the engine.

The peripheral grooves 3, 4 and 5 are disposed in consecutive relationship in the direction from the combustion chamber C towards the crankcase.

The groove 5 furthest away from the chamber C is a scraper groove having a scraper ring 8 which is received with reduced clearance between the plane transverse surfaces 5a, 5b of groove 5. The scraper ring 8 has conventional channels 11 through which the oil scraped by the ring 8 can discharge towards the base of groove 5. The base of groove 5 is formed with orifices 12 via which groove 5 can communicate with a space D inside piston 1, space D communicating with the crankcase.

The two grooves 3 and 4 nearest the chamber C are sealing grooves receiving the fully-rectangular section rings 6, 7, the cross-sectional shape serving to promote sealing tightness between the cylindrical wall of piston 1 and the cylinder 2. The rings 6, 7 are conventional elements in the form of split resilient rings which are received with a reduced clearance between the plane transverse surfaces 3a, 3b and 4a, 4b of the grooves 3 and 4. The rings 6, 7 engage in the cylinder 2 with slight biassing so that the outside peripheral surface of the rings 6, 7 is applied to the surface of the bore of cylinder 2. The height of engagement of the rings in the grooves 3, 4 is represented by the reference $h$ in FIG. 1; a clearance $j$ is left between the base of the groove and the inside cylindrical surface of the rings 6, 7. The ring 6 nearest the chamber C is usually called the "firing" ring, the intermediate ring 7 serving to provide sealing-tightness.

There is also a clearance similar to the clearance $j$ between the scraper ring 8 and the base of the groove associated therewith.

In the case of each sealing groove 3, 4 but not in the case of the scraper groove 5 having the scraper ring 8, first narrow passage means $M_1$ provides a permanent communication between the base of the groove 3, 4 and the annular gaps $e_1$, $e_2$ respectively in the case of the groove 3 and the annular gaps $e_2$ and $e_3$ respectively in the case of the groove 4, such gaps being disposed on either side of the ring 6, 7 associated with the particular groove concerned. In the case of the groove 5 second narrow passage means $M_2$ provides a permanent communication between the groove base and at least the annular gap $e_3$ which is disposed near the chamber C in relation to the scraper ring 8.

Both the passage means $M_1$, $M_2$ are disposed at a level above that of the bottom zone E of the cylinder where liquid lubricant may collect when the engine stops.

The first passage means $M_1$ is formed, in each groove 3, 4 and in each plane transverse surface 3a, 3b and 4a, 4b by at least one recess 15, 16 in the case of the groove 3 and 13, 14 in the case of groove 4. The second narrow passage means $M_2$ is formed by a recess 17 at least in that surface 5a of the groove 5 which is near the combustion chamber C. Each of the recesses 13 to 17 extends to the outside surface of piston 1 and extends towards the groove base over a vertical distance at least equal to the vertical distance $h$ over which the ring is received in the groove. Preferably, the recesses 13 to 17 are disposed above the horizontal plane passing through the piston axis A; the region where the recesses 13 to 17 are present is disposed substantially diammetrically opposite to the bottom zone E.

Preferably, the recesses 13, 14 in each transverse surface 4a, 4b of the groove 4 are disposed opposite one another. As can be seen in FIG. 2, each such recess has, in cross-section, the shape of a segment of a circle; advantageously, the circle segments formed by the cross-sections of the oppositely disposed recesses 13, 14 are inscribed in a single circumference. The recesses 13, 14 can therefore be machined directly in a single step, e.g. through the agency of a drill bit whose diameter is greater than the width of the groove 4; introducing such a bit into the groove removes material in the shape of the recesses 13, 14. The features just outlined also apply to the recesses 15, 16. The recess 17 also resembles a segment of a circle in cross-section. The dimension $l$ (FIG. 2) of the recesses along the cylinder axis is at most 0.2 mm. As is clearly visible in FIG. 2, the recesses in any two consecutive grooves are staggered transversely—i.e., around the peripheral circumference of the grooves.

The passage means $M_1$, $M_2$ according to the invention are a means of reducing and substantially obviating the smoke cloud which has previously been a phenomenon frequently associated with the starting of flat cylinder engines, inter alia of four-stroke engines whose cylinders have completely closed cylinder walls.

In practice, the invention resides in the discovery that the basic reason for the smoke cloud is that a depression occurs in the combustion chamber C relatively to the crankcase when the engine is stopped. It has been found that the negative pressure mainly arises, in the case of a combustion chamber C which is closed at engine stoppage, when the engine cools, due to the contraction in the volume of gas trapped in the combustion chamber. The negative pressure may become sufficient to suck into the chamber C oil which has collected in the zone E near the bottom generatrix of the cylinder 2, on the crankcase side thereof. The phenomenon occurs inter alia when the gap in the segments 6 and 7 is in the zone of the bottom generatrix 2. Such gap—i.e., the gap between the two adjacent ends of a ring—provides a passage through which oil can reach the combustion chamber C. The passage means $M_1$ and $M_2$ according to the invention are a means of providing a restricted communication between the chamber C and the crankcase and therefore serve as means for inhibiting the pressure in the combustion chamber being reduced below the pressure in the crankcase when the engine stops.

Since the pressure in the combustion chamber C cannot fall appreciably below the pressure in the crankcase, there is a considerable reduction almost to vanishing point of any oil flow from the crankcase to the combustion chamber when the engine stops.

The communication provided by the various recesses 13 to 17 and the annular gaps $e_1$, $e_2$, $e_3$ in combination with the clearances between the rings and the bases of the grooves 3 to 5 is a narrow baffled communication, and so the resulting continuous commuication has virtually no dynamic effect in engine operation.

Also, means can be provided for retaining each ring 6, 7, 8 in a predetermined angular position in its respective groove. Such means enable each ring to be maintained in a particular angular position relatively to the cylinder. One possibility is for the split in each ring to be maintained in a zone diammetrically opposite the bottom zone E.

I claim:

1. A reciprocating internal combustion engine, comprising:
  a cylinder having a substantially horizontal axis and having one end thereof shaped as a combustion chamber and the other end thereof opening into a crankcase adapted to receive a lubricating atmosphere, said cylinder having a bottom zone where liquid lubricant may collect when the engine is stationary;

a piston slidable in said cylinder and having a space therein communicating with said crankcase, said piston having an outside surface formed with at least one peripheral sealing groove and a peripheral scraper groove, said peripheral grooves being of rectangular cross-section with a base and a pair of transverse surfaces, said scraper groove being nearest said other end of said cylinder and having the base thereof formed with orifices via which said scraper groove communicates with said space in said piston;

a substantially rectangular cross-section piston ring received with a reduced clearance in each said sealing groove; and a substantially rectangular cross-section scraper ring received with a reduced clearance in said scraper groove;

said piston being received in said cylinder with clearance whereby annular gaps are formed between said outside surface of said piston and said cylinder on each side of each of said piston and scraper rings; in which engine the improvement comprises:

each said sealing groove being provided with first narrow passage means providing a continuous communication between the base of said sealing groove and said annular gaps on both sides of said piston ring in said sealing groove;

said scraper groove being provided with second narrow passage means providing communication between the base of said second groove and at least that annular gap which is on the side of said scraper ring nearest said one end of said cylinder;

both said first and said second passage means being disposed at a level above said bottom zone of said cylinder.

2. An engine as claimed in claim 1, wherein said first passage means comprises at least one recess on each transverse surface of said sealing groove and said second passage means comprises at least one recess on that transverse surface of said scraper groove which is nearest said one end of said cylinder, said recesses extending from said outside surface of said piston towards the bases of said grooves over a distance at least equal to the engaged thicknesses of said sealing and scraper rings in said grooves.

3. An engine as claimed in claim 2, wherein said recess in one transverse surface of said sealing groove is disposed opposite a corresponding recess in the other transverse surface of said sealing groove.

4. An engine as claimed in claim 2, wherein each said recess has a cross-section in the form of a segment of a circle.

5. An engine as claimed in claim 4, wherein the maximum dimension of each said recess along said axis of said cylinder is at most 0.2 millimeter.

6. An engine as claimed in claim 2, wherein said recesses of adjacent grooves are staggered relative to one another in the peripheral direction.

7. An engine as claimed in claim 3, wherein each said recess in said transverse surfaces of said sealing groove has a cross-section in the form of a segment of a circle, and wherein the cross-sections of said opposed recesses are inscribed in a single circle.

8. An engine as claimed in claim 1, wherein said first and second passage means are disposed substantially diametrically opposite the bottom generatrix of said outside surface of said piston.

* * * * *